US005654075A

United States Patent [19]

Ramirez

[11] Patent Number: 5,654,075

[45] Date of Patent: Aug. 5, 1997

[54] FOOD PREPARATION FOIL

[76] Inventor: Yvette Ramirez, 10520 Hwy. 188, Grand Bay, Ala. 36541

[21] Appl. No.: 633,679

[22] Filed: Apr. 17, 1996

[51] Int. Cl.$^{6}$ .................................... B32B 3/10; B32B 3/28

[52] U.S. Cl. .......................... 428/130; 428/137; 428/181; 426/113

[58] Field of Search .................................... 428/130, 124, 428/137, 131, 181, 182; 426/113, 412, 415

[56] References Cited

U.S. PATENT DOCUMENTS

| | | | |
|---|---|---|---|
| 3,155,304 | 11/1964 | Beerend | 229/3.1 |
| 3,415,662 | 12/1988 | Koger et al. | 426/113 |
| 3,488,252 | 1/1970 | Lamar | 161/213 |
| 3,934,748 | 1/1976 | Racz | 220/9 R |
| 4,320,699 | 3/1982 | Binks | 99/349 |
| 4,434,197 | 2/1984 | Petriello et al. | 427/407.1 |
| 5,259,299 | 11/1993 | Ferraro | 99/340 |

*Primary Examiner*—Alexander Thomas
*Attorney, Agent, or Firm*—Joseph N. Breaux

[57] ABSTRACT

A food preparation foil including a metal foil layer having a first flexible non-stick coating created on the metal foil layer and having channel folds running the width thereof that are oriented in parallel and spaced at intervals of about one and one-half (1½") inch. Each channel fold includes a number of steam release apertures formed therethrough.

10 Claims, 2 Drawing Sheets

FOOD PREPARATION FOIL

TECHNICAL FIELD

The present invention relates to articles used for food preparation and more particularly to a food preparation foil product having at least one flexible non-stick surface in connection with a metal foil base layer that includes a number of folded channels formed therein having a plurality of steam release apertures formed within a channel forming surface.

BACKGROUND ART

It is often desirable when cooking in a conventional oven to cover at least a portion of the food item being prepared with a radiant heat shielding foil. The foil reflects some of the radiant heat from the surface of the food item and spreads or conducts the unreflected heat away from the food item to prevent burning or too rapid browning. Although using a conventional aluminum type foil achieves the desired shielding effect, the foil sometimes adheres to the food item during the cooking process resulting in an esthetic loss in the presentation quality of the food item. It would be desirable, therefore, to have a shielding foil product that may be used in conventional ovens for shielding food items from a radiant heat source that includes at least one flexible non-stick surface to reduce the incidence of food adhesion to the foil product during the cooking process.

Also it is often desirable to have a mechanism for releasing steam generated during cooking from within the volume enclosed by a foil type shielding product. However, having steam release apertures formed through the shielding product on an area of the shielding product that contacts the food being cooked often results in the shielding product adhering to the food. It would be desirable, therefore, to have a foil type cooking shield that included a number of preformed apertures that are positioned away from the food being cooked.

GENERAL SUMMARY DISCUSSION OF INVENTION

It is thus an object of the invention to provide a food preparation foil that includes a flexible non-stick surface in connection with a metal foil layer.

It is a further object of the invention to provide a food preparation foil that has a flexible non-stick coating deposited on an aluminum foil substrate.

It is a still further object to provide a food preparation foil that includes a flexible non-stick surface in connection with a metal foil layer that includes a number of steam release apertures preformed therethrough.

Accordingly, a food preparation foil is provided. The food preparation foil comprises a metal foil layer having a first flexible non-stick coating layer formed on the metal foil layer; the food preparation foil having a plurality of fold channels formed therein, each fold channel being formed by first, second, third, and fourth substantially parallel preliminary folds, each channel fold having a plurality of steam release apertures formed through the foil layer and the non-stick coating layer along a section of the channel fold located between the second and third preliminary folds.

The flexible non-stick coating is preferably formed on the metal foil layer by negatively charging the metal foil layer, spraying a positively charged tetrafluoroethylene polymer powder onto a first side surface of the negatively charged metal foil, and then exposing the metal foil/ tetrafluoroethylene powder combination to a temperature profile sufficient to cause the tetrafluoroethylene powder to flow and solidify into the flexible non-stick coating upon the first side surface of the metal foil. Although various types of metal foil may be used to practice the invention, the metal foil is preferably aluminum foil.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
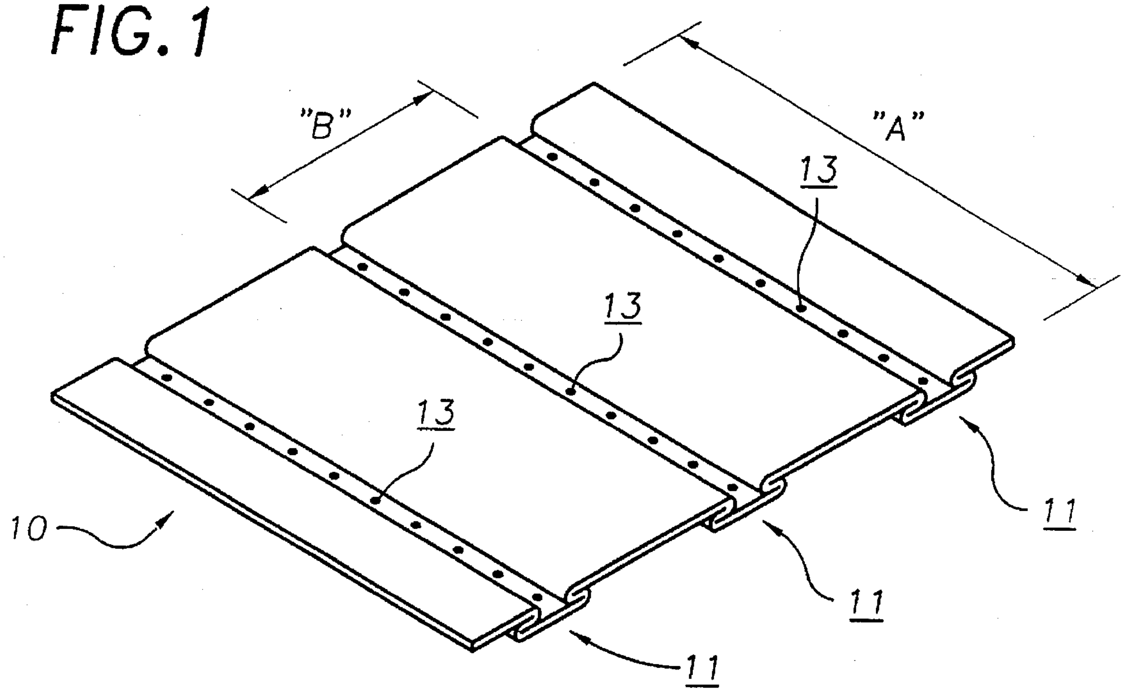
FIG. 1 is a perspective view of a section of an exemplary embodiment of the food preparation foil of the present invention showing the foil layer, the flexible non-stick coating layer, and three of the fold channels.

FIG. 1 shows a section of an exemplary embodiment of the food preparation foil of the present invention generally designated by the numeral 10. Food preparation foil 10 includes channel folds 11 running the width "A" thereof, oriented in parallel and spaced at intervals "B" of about one and one-half (1½") inch. Each channel fold 11 includes a number of steam release apertures 13 formed therethrough. Although the exemplary spaced intervals "B" are about one and one-half (1½") inch, intervals "B" of between one and three inches are suitable.

Figure 2:
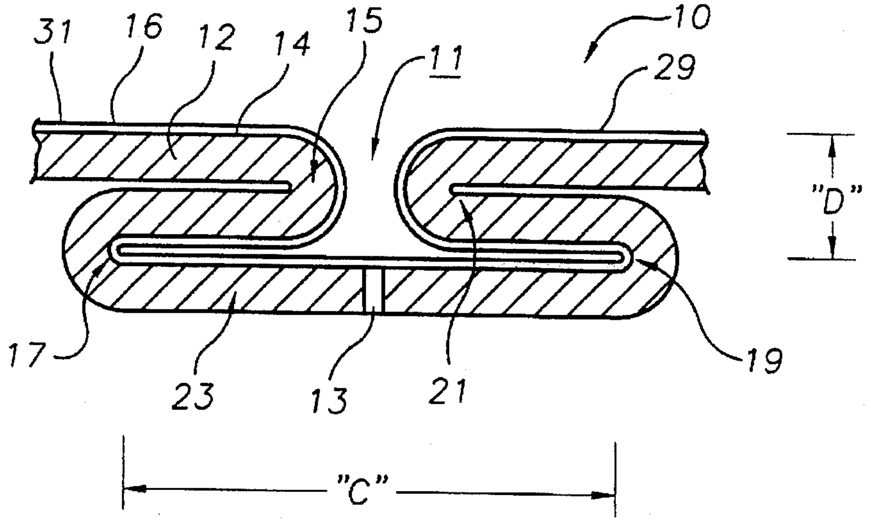
FIG. 2 is a cross-sectional view through of the fold channels of FIG. 1 showing the first, second, third and fourth preliminary folds and one of the steam release apertures.

With reference to FIG. 2, food preparation foil 10 includes a first aluminum foil layer 12 having a first side 14 onto which a first flexible non-stick coating 16 has been formed. Channel fold 11 is formed by forming first, second, third, and fourth preliminary folds 15,17,19,21. One of the steam release apertures 13 is shown formed through a section 23 of food preparation foil 10 that has a width "C" of about two-tenths (2/10") of an inch and that is located between second and third preliminary folds 17,19. Steam release aperture 13 is formed through first flexible coating layer 16 and first aluminum foil layer 12 and has a diameter of about one twentieth (1/20") of an inch. Steam release apertures 13 are thus separated from the food by a distance "D" of at least two thicknesses of food preparation foil 10. In addition, distance can be increased by pulling first and second sides 29,31 with sufficient force to partially unfold preliminary folds 15,17,19 and 20.

Figure 3:
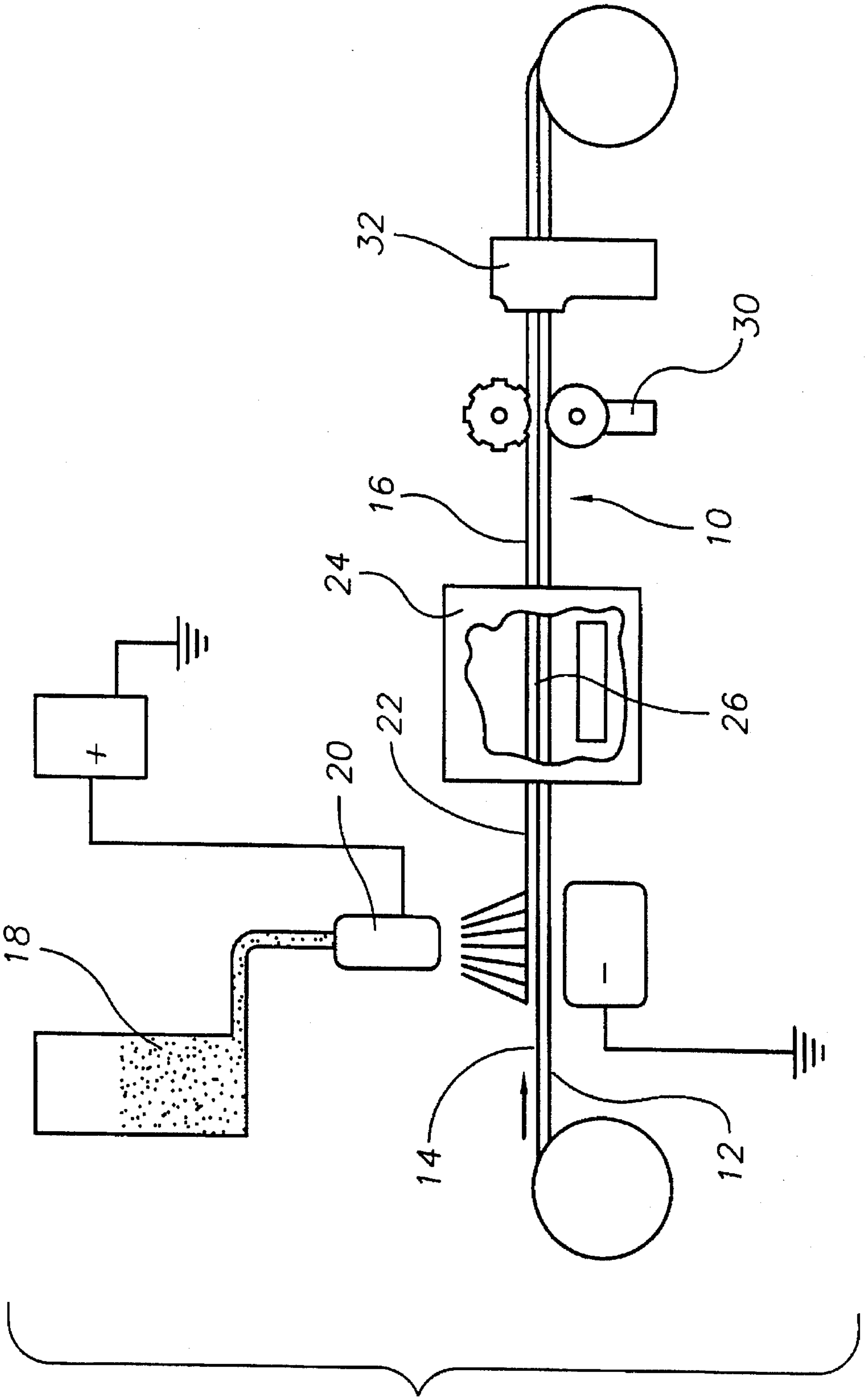
FIG. 3 is a schematic view showing an exemplary process for applying the flexible non-stick coating to an aluminum foil base layer, perforating the combined foil and non-stick coating layers and then forming the first, second, third and fourth preliminary folds.

With reference to FIG. 3, first flexible non-stick coating 16 is formed on first side 14 of aluminum foil layer 12 by placing a negative electrical charge on foil layer 12, placing a positive electrical charge on a plurality of tetrafluoroethylene polymer powder particles 18 within a spray nozzle 20, and spraying the tetrafluoroethylene polymer powder particles 18 onto first side 14 of negatively charged aluminum foil layer 12 to create a particle layer 22 of tetrafluoroethylene polymer powder. Foil layer 12, along with particle layer 22, is then fed into a heat chamber 24 and exposed to temperatures sufficient to cause the tetrafluoroethylene powder particles to flow and form an even tetrafluoroethylene polymer coating 26 over first side 14, between about five-hundred (500°) and five-hundred-fifty (550°) degrees Fahrenheit. Foil layer 12 and polymer coating 26 are then fed from heat chamber 24 and exposed to ambient atmospheric temperature conditions, between about fifty (50°) and one-hundred (100°) degrees Fahrenheit, for a period of time sufficient to cause polymer coating 26 to solidify into flexible non-stick coating 16 formed from the flexible non-stick tetrafluoroethylene. Food preparation foil 10 is then fed through a perforating unit 30 to form steam release apertures 13 (FIGS. 1 and 2) and then through a folding unit 32 to form channel folds 11 (FIGS. 1 and 2).

Food preparation foil 10 is utilized in the same fashion as conventional aluminum foil except that flexible non-stick coating 16 is placed against or directed toward the food item. Even if contact between flexible non-stick coating 16 and the food item occurs, damage to the food item as a result of adhesion to flexible non-stick coating 16 is minimized when compared to conventional aluminum foil usage. In addition, because steam release apertures 13 are separated from the food by at least a distance "D", the incidence of food sticking to the edges of steam release apertures 13 is reduced.

It can be seen from the preceding description that a food preparation foil has been provided that includes at least one flexible non-stick surface in connection with a metal foil layer; that has at least one flexible-non-stick coating deposited on an aluminum foil substrate; and that has a number of steam release apertures formed therethrough.

It is noted that the embodiment of the food preparation foil described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A food preparation foil comprising:

a metal foil layer having a first side surface; and a first flexible non-stick coating layer created on said metal foil layer;

said food preparation foil having a plurality of fold channels formed therein, each of said plurality of fold channels being formed by first, second, third, and fourth substantially parallel preliminary folds, each channel fold having a plurality of steam release apertures formed through said foil layer and said non-stick coating layer along a section of said channel fold located between said second and third preliminary folds.

2. The food preparation foil of claim 1, wherein:

said metal foil is an aluminum foil.

3. The food preparation foil of claim 1, wherein:

said flexible non-stick coating layer is formed by negatively charging said metal foil layer, spraying a positively charged tetrafluoroethylene polymer powder onto said first side surface of said metal foil bearing said negative charge, and then exposing said metal foil tetrafluoroethylene powder combination to a temperature profile sufficient to cause said tetrafluoroethylene powder to flow and then solidify into said flexible non-stick coating upon said first side surface of said metal foil.

4. The food preparation foil of claim 3 wherein:

a first portion of said temperature profile is a first time period wherein said tetrafluoroethylene powder is subjected to temperatures between about five-hundred (500°) and five-hundred-fifty (550°) degrees Fahrenheit for a period of time sufficient to cause said tetrafluoroethylene powder to flow.

5. The food preparation foil of claim 4 wherein:

a second portion of said temperature profile is a second time period wherein said tetrafluoroethylene powder is subjected to temperatures between about fifty (50°) and one-hundred (100°) degrees Fahrenheit for a period of time sufficient to cause said flowing tetrafluoroethylene to solidify into a flexible non-stick coating.

6. The food preparation foil of claim 1 wherein:

said plurality of channel folds are oriented in parallel with each other and are spaced at intervals of between one and three inches.

7. The food preparation foil of claim 6, wherein:

said metal foil is an aluminum foil.

8. The food preparation foil of claim 6, wherein:

said flexible non-stick coating layer is formed by negatively charging said metal foil layer, spraying a positively charged tetrafluoroethylene polymer powder onto said first side surface of said metal foil bearing said negative charge, and then exposing said metal foil tetrafluoroethylene powder combination to a temperature profile sufficient to cause said tetrafluoroethylene powder to flow and then solidify into said flexible non-stick coating upon said first side surface of said metal foil.

9. The food preparation foil of claim 8 wherein:

a first portion of said temperature profile is a first time period wherein said tetrafluoroethylene powder is subjected to temperatures between about five-hundred (500°) and five-hundred-fifty (550°) degrees Fahrenheit for a period of time sufficient to cause said tetrafluoroethylene powder to flow.

10. The food preparation foil of claim 9 wherein:

a second portion of said temperature profile is a second time period wherein said tetrafluoroethylene powder is subjected to temperatures between about fifty (50°) and one-hundred (100°) degrees Fahrenheit for a period of time sufficient to cause said flowing tetrafluoroethylene to solidify into a flexible non-stick coating.

* * * * *